(12) United States Patent
Gupta et al.

(10) Patent No.: US 9,535,264 B2
(45) Date of Patent: Jan. 3, 2017

(54) FLUID LENSES, LENS BLANKS, AND METHODS OF MANUFACTURING THE SAME

(75) Inventors: Amitava Gupta, Roanoke, VA (US); Urban Schnell, Münchenbuchsee (CH)

(73) Assignee: Adlens Beacon, Inc., Pembroke Park, FL (US)

( * ) Notice: Subject to any disclaimer, the term of this patent is extended or adjusted under 35 U.S.C. 154(b) by 0 days.

(21) Appl. No.: 13/549,078

(22) Filed: Jul. 13, 2012

(65) Prior Publication Data

US 2014/0016087 A1    Jan. 16, 2014

(51) Int. Cl.
*G02C 7/08* (2006.01)
*B29D 11/00* (2006.01)

(52) U.S. Cl.
CPC ......... *G02C 7/085* (2013.01); *B29D 11/00028* (2013.01); *B29D 11/0073* (2013.01); *B29D 11/00298* (2013.01); *Y10T 156/108* (2015.01)

(58) Field of Classification Search
CPC ........... G02C 7/08; G02C 7/081; G02C 7/085; B29D 11/0073; B29D 11/00298; B29D 11/00028
USPC ........................ 351/159.05, 159.06, 159.1, 351/159.12–159.14, 159.2, 159.34, 351/159.41, 159.47, 159.48, 159.67, 351/159.68, 159.7, 159.71
See application file for complete search history.

(56) References Cited

U.S. PATENT DOCUMENTS

| | | |
|---|---|---|
| 2,576,581 A | 11/1951 | Edwards |
| 2,836,101 A | 5/1958 | De Swart |
| 2,976,766 A | 3/1961 | Bianchi |
| 3,598,479 A * | 8/1971 | Wright .................... G02C 7/085 351/159.04 |
| 3,614,215 A | 10/1971 | Mackta |
| 4,450,593 A | 5/1984 | Poler |
| 4,827,485 A * | 5/1989 | Scerbak .............. H01S 3/09415 372/101 |
| 4,890,903 A | 1/1990 | Treisman et al. |
| 4,913,536 A | 4/1990 | Barnea |
| 4,969,729 A * | 11/1990 | Merle ................ B29D 11/0073 156/153 |

(Continued)

FOREIGN PATENT DOCUMENTS

GB          1171294 A     11/1969
WO    WO 2008/063442 A1    5/2008

OTHER PUBLICATIONS

Borish, I.M., *Clinical Refraction*, 3rd Edition, Chapter 26 (pp. 1051-1113), The Professional Press, Inc., Chicago (1970), 65 pages.

(Continued)

*Primary Examiner* — Bumsuk Won
*Assistant Examiner* — William R Alexander
(74) *Attorney, Agent, or Firm* — Greenberg Traurig, LLP

(57) ABSTRACT

A lens blank for a fluid lens includes a rigid lens and a semi-flexible inflatable membrane attached to the rigid lens. The lens blank is divided into a cavity zone and a bonded zone. The cavity zone extends radially outward from a central area of the lens blank and a cavity is formed between the membrane and the rigid lens within the cavity zone. The bonded zone extends radially outward from the cavity zone and the membrane is bonded and fluidly sealed to the rigid lens throughout the bonded zone. The bonded zone is dimensioned to be trimmed to accommodate a plurality of frame shapes and sizes. Methods of manufacturing lens blanks are also provided. Arrays of lens blanks and fluid lenses are also provided.

17 Claims, 16 Drawing Sheets

FIG. 1

(56) References Cited

U.S. PATENT DOCUMENTS

| | | | |
|---|---|---|---|
| 5,080,476 A | 1/1992 | Monin | |
| 5,080,839 A | 1/1992 | Kindt-Larsen | |
| 5,138,494 A | 8/1992 | Kurtin | |
| 5,182,585 A | 1/1993 | Stoner | |
| 5,229,885 A | 7/1993 | Quaglia | |
| D340,733 S * | 10/1993 | Hall | D16/306 |
| 5,371,629 A * | 12/1994 | Kurtin | G02C 7/085 |
| | | | 351/158 |
| 5,440,357 A | 8/1995 | Quaglia | |
| 5,515,203 A | 5/1996 | Nye | |
| 5,574,598 A | 11/1996 | Koumura et al. | |
| 5,668,620 A | 9/1997 | Kurtin et al. | |
| 5,684,637 A * | 11/1997 | Floyd | G02C 7/085 |
| | | | 359/666 |
| 5,731,909 A | 3/1998 | Schachar | |
| 5,739,959 A | 4/1998 | Quaglia | |
| 5,900,921 A | 5/1999 | Min | |
| 5,956,183 A * | 9/1999 | Epstein | G02B 3/14 |
| | | | 359/365 |
| 5,973,852 A | 10/1999 | Task | |
| 5,999,328 A | 12/1999 | Kurtin et al. | |
| 6,040,947 A | 3/2000 | Kurtin et al. | |
| 6,053,610 A | 4/2000 | Kurtin et al. | |
| 6,069,742 A | 5/2000 | Silver | |
| 6,104,446 A * | 8/2000 | Blankenbecler | G02F 1/133621 |
| | | | 349/5 |
| 6,188,525 B1 | 2/2001 | Silver | |
| 6,246,528 B1 | 6/2001 | Schachar | |
| 6,288,846 B1 | 9/2001 | Stoner, Jr. | |
| 6,355,124 B1 | 3/2002 | Blomberg et al. | |
| 6,511,617 B1 * | 1/2003 | Martin | B29C 31/00 |
| | | | 264/1.36 |
| 6,552,860 B1 | 4/2003 | Alden | |
| 6,618,208 B1 | 9/2003 | Silver | |
| 6,626,532 B1 | 9/2003 | Nishioka et al. | |
| 6,715,876 B2 | 4/2004 | Floyd | |
| 6,930,838 B2 | 8/2005 | Schachar | |
| 6,992,843 B2 | 1/2006 | Juhala | |
| 7,068,439 B2 | 6/2006 | Esch et al. | |
| 7,085,065 B2 | 8/2006 | Silver | |
| 7,142,369 B2 | 11/2006 | Wu et al. | |
| 7,256,943 B1 | 8/2007 | Kobrin et al. | |
| 7,324,287 B1 | 1/2008 | Gollier | |
| 7,325,922 B2 | 2/2008 | Spivey | |
| 7,338,159 B2 | 3/2008 | Spivey | |
| 7,369,321 B1 | 5/2008 | Ren et al. | |
| 7,382,544 B2 | 6/2008 | Cernasov | |
| 7,423,811 B2 | 9/2008 | Silver | |
| 7,440,193 B2 | 10/2008 | Gunasekaran et al. | |
| 7,453,646 B2 | 11/2008 | Lo | |
| 7,475,985 B2 | 1/2009 | Blum et al. | |
| 7,580,195 B2 | 8/2009 | Choi et al. | |
| 7,580,197 B2 | 8/2009 | Omura et al. | |
| 7,594,726 B2 | 9/2009 | Silver | |
| 7,604,349 B2 | 10/2009 | Blum et al. | |
| 7,646,544 B2 | 1/2010 | Batchko et al. | |
| 7,675,686 B2 | 3/2010 | Lo et al. | |
| 7,697,214 B2 | 4/2010 | Batchko et al. | |
| 7,701,643 B2 | 4/2010 | Batchko et al. | |
| 7,706,077 B2 | 4/2010 | Batchko et al. | |
| 7,768,712 B2 | 8/2010 | Silver et al. | |
| 7,789,013 B2 | 9/2010 | Silver | |
| 7,826,145 B2 | 11/2010 | Justis et al. | |
| 7,866,816 B2 | 1/2011 | Kurtin | |
| 7,898,742 B2 | 3/2011 | Rodríguez Fernández et al. | |
| 8,018,658 B2 | 9/2011 | Lo | |
| 8,087,778 B2 | 1/2012 | Gupta et al. | |
| 8,120,860 B2 | 2/2012 | Suzuki et al. | |
| 8,130,449 B2 | 3/2012 | Obrebski et al. | |
| 8,179,888 B2 | 5/2012 | Chen et al. | |
| 2004/0001180 A1 * | 1/2004 | Epstein | G02C 7/085 |
| | | | 351/159.68 |
| 2006/0066808 A1 | 3/2006 | Blum et al. | |
| 2006/0077562 A1 | 4/2006 | Silver | |
| 2006/0245071 A1 | 11/2006 | George et al. | |
| 2006/0250699 A1 | 11/2006 | Silver | |
| 2006/0256071 A1 * | 11/2006 | Kim | G02C 7/101 |
| | | | 345/106 |
| 2007/0201138 A1 * | 8/2007 | Lo | G02B 3/14 |
| | | | 359/666 |
| 2007/0211207 A1 * | 9/2007 | Lo | G02B 3/14 |
| | | | 351/41 |
| 2007/0263293 A1 * | 11/2007 | Batchko et al. | 359/666 |
| 2008/0084532 A1 * | 4/2008 | Kurtin | G02B 3/14 |
| | | | 351/57 |
| 2008/0111969 A1 * | 5/2008 | Covarrubias | B23K 26/0823 |
| | | | 351/178 |
| 2008/0316587 A1 | 12/2008 | Tijburg et al. | |
| 2009/0052049 A1 * | 2/2009 | Batchko et al. | 359/666 |
| 2009/0086331 A1 | 4/2009 | Gunasekaran et al. | |
| 2009/0195882 A1 | 8/2009 | Bolle et al. | |
| 2009/0213471 A1 * | 8/2009 | Silver et al. | 359/665 |
| 2010/0020285 A1 * | 1/2010 | Berge | G02B 3/14 |
| | | | 351/159.41 |
| 2010/0033830 A1 | 2/2010 | Yung | |
| 2010/0053543 A1 * | 3/2010 | Silver | G02B 3/14 |
| | | | 351/51 |
| 2010/0202054 A1 * | 8/2010 | Niederer | 359/558 |
| 2010/0208194 A1 | 8/2010 | Gupta et al. | |
| 2010/0208357 A1 * | 8/2010 | Batchko | G02B 3/14 |
| | | | 359/666 |
| 2010/0284089 A1 * | 11/2010 | Shyu | G02B 3/0062 |
| | | | 359/622 |
| 2011/0085131 A1 * | 4/2011 | Gupta | G02C 7/085 |
| | | | 351/159.6 |
| 2011/0085243 A1 * | 4/2011 | Gupta | G02C 7/085 |
| | | | 359/666 |
| 2011/0102735 A1 | 5/2011 | Gupta et al. | |
| 2011/0102738 A1 | 5/2011 | Gupta et al. | |
| 2011/0149234 A1 * | 6/2011 | Biton et al. | 351/177 |
| 2011/0157712 A1 * | 6/2011 | Silver et al. | 359/666 |
| 2011/0194096 A1 * | 8/2011 | Boom et al. | 355/77 |
| 2011/0235186 A1 | 9/2011 | Blum et al. | |
| 2011/0249232 A1 | 10/2011 | Senatore et al. | |
| 2011/0261466 A1 * | 10/2011 | Buch | G02C 7/085 |
| | | | 359/666 |
| 2012/0019773 A1 * | 1/2012 | Blum et al. | 351/169 |
| 2012/0041553 A1 | 2/2012 | Gupta et al. | |
| 2012/0087014 A1 | 4/2012 | Nibauer et al. | |
| 2012/0087015 A1 * | 4/2012 | Nibauer | G02B 3/14 |
| | | | 359/665 |
| 2012/0154925 A1 | 6/2012 | Gupta et al. | |
| 2012/0192991 A1 | 8/2012 | Gupta et al. | |
| 2012/0243106 A1 | 9/2012 | Gupta et al. | |

OTHER PUBLICATIONS

Jalie, M., *The Principles of Ophthalmic Lenses, 4th Edition*, Chapter 18 (pp. 413-468), The Association of Dispensing Opticians, Hazell Watson & Viney Limited, London (1984), 58 pages.

Markoff, J., "Scientists at Work: Stephen Kurtin—Making Eyeglasses That Let Wearers Change Focus on the Fly," *The New York Times*, 3 pages (Aug. 4, 2009), 3 pages.

Tang, S.K.Y. et al., "Dynamically Reconfigurable Liquid-Core Liquid-Cladding Lens in a Microfluidic Channel," *Lab on a Chip*, 8(3):395-401, The Royal Society of Chemistry, United Kingdom (Mar. 2008), 7 pages.

Egan, W. et al., U.S. Appl. No. 13/270,797, filed Oct. 11, 2011, entitled "Fluid Filled Adjustable Contact Lenses,".

Egan, W. et al., U.S. Appl. No. 13/293,814, filed Nov. 10, 2011, entitled "Fluid-Filled Lenses and Actuation Systems Thereof,".

Senatore, D. et al., U.S. Appl. No. 12/904,720, filed Oct. 14, 2010, entitled "Fluid Filled Lenses and Mechanisms of Inflation Thereof,".

Senatore, D. et al., U.S. Appl. No. 13/000,887, filed Dec. 22, 2010, entitled "Fluid Filled Lenses and Mechanisms of Inflation Thereof,".

(56) References Cited

OTHER PUBLICATIONS

International Search Report for International Application No. PCT/US13/50339, United States Patent and Trademark Office, Alexandria, Virginia, mailed on Oct. 29, 2013.

* cited by examiner

FLUID LENSES, LENS BLANKS, AND METHODS OF MANUFACTURING THE SAME

BACKGROUND

Field

Embodiments of the present invention relate to lens blanks for fluid lenses and methods of manufacturing fluid lenses.

Background Art

Basic fluid lenses have been known since about 1958, as described in U.S. Pat. No. 2,836,101 to Swart, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in their entirety. These applications of fluid lenses are directed towards photonics, digital phone and camera technology, and microelectronics.

Fluid lenses have also been proposed for ophthalmic applications (see, e.g., U.S. Pat. No. 7,085,065 to Silver, which is incorporated herein by reference in its entirety). Power adjustment in fluid lenses has been accomplished for example by injecting fluid into a lens cavity, by electrowetting, application of ultrasonic impulse, and by utilizing swelling forces in a cross-linked polymer upon introduction of a swelling agent, such as water.

BRIEF SUMMARY

In some embodiments, a lens blank for a fluid lens includes a rigid lens and a semi-flexible inflatable membrane attached to the rigid lens. The lens blank is divided into a cavity zone and a bonded zone. The cavity zone extends radially outward from a central area of the lens blank and a cavity is formed between the membrane and the rigid lens within the cavity zone. The bonded zone extends radially outward from the cavity zone and the membrane is bonded and fluidly sealed to the rigid lens throughout the bonded zone. The bonded zone is dimensioned to be trimmed to accommodate a plurality of frame shapes and sizes.

In some embodiments, a method of manufacturing a fluid lens assembly includes bonding a portion of the membrane to the rigid lens so that the bonded area of the membrane is fluidly sealed to the rigid lens. The bonded area is dimensioned such that the lens blank may be trimmed to form a trimmed lens having a bonded loop area with a width and height corresponding to any common spectacle lens size. The method further includes trimming the lens blank to form a trimmed lens having a bonded loop area with a width and height corresponding to a common spectacle lens size.

In some embodiments, frame-independent designs for common spectacle lens sizes and shapes may be realized. Such frame-independent designs may in some cases enable the use of a reduced number of stock-keeping units (SKUs) of components for the fluid lens. For example, in some embodiments, a single SKU for each component may be used for both left-eye lenses and right-eye lenses.

In some embodiments, an array of fluid lenses includes a plurality of fluid lenses, each having a rigid lens and a semi-flexible inflatable membrane attached to the rigid lens. The fluid lens is divided into at least two zones, the zones including a cavity zone extending radially outward from a central area of the fluid lens, forming a cavity between the membrane and the rigid lens in the cavity zone, and a bonded zone extending radially outward from the cavity zone. The membrane is bonded and fluidly sealed to the rigid lens throughout the bonded zone. One or more of the plurality of lens blanks are fluidly connected to one or more of the other fluid lenses within the array.

Certain embodiments, features, and advantages of the present invention, as well as the structure and operation of various embodiments of the present invention, are described in detail herein with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain principles of embodiments of the invention and enable a person skilled in the pertinent art to make and use the embodiments of the invention.

The present invention will be described with reference to the accompanying drawings.

DETAILED DESCRIPTION

While specific configurations and arrangements are discussed, it should be understood that this is done for illustrative purposes only. A person skilled in the pertinent art will recognize that other configurations and arrangements may be used without departing from the spirit and scope of the present invention. It will be apparent to a person skilled in the pertinent art that this invention may also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases may not refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Figure 1:
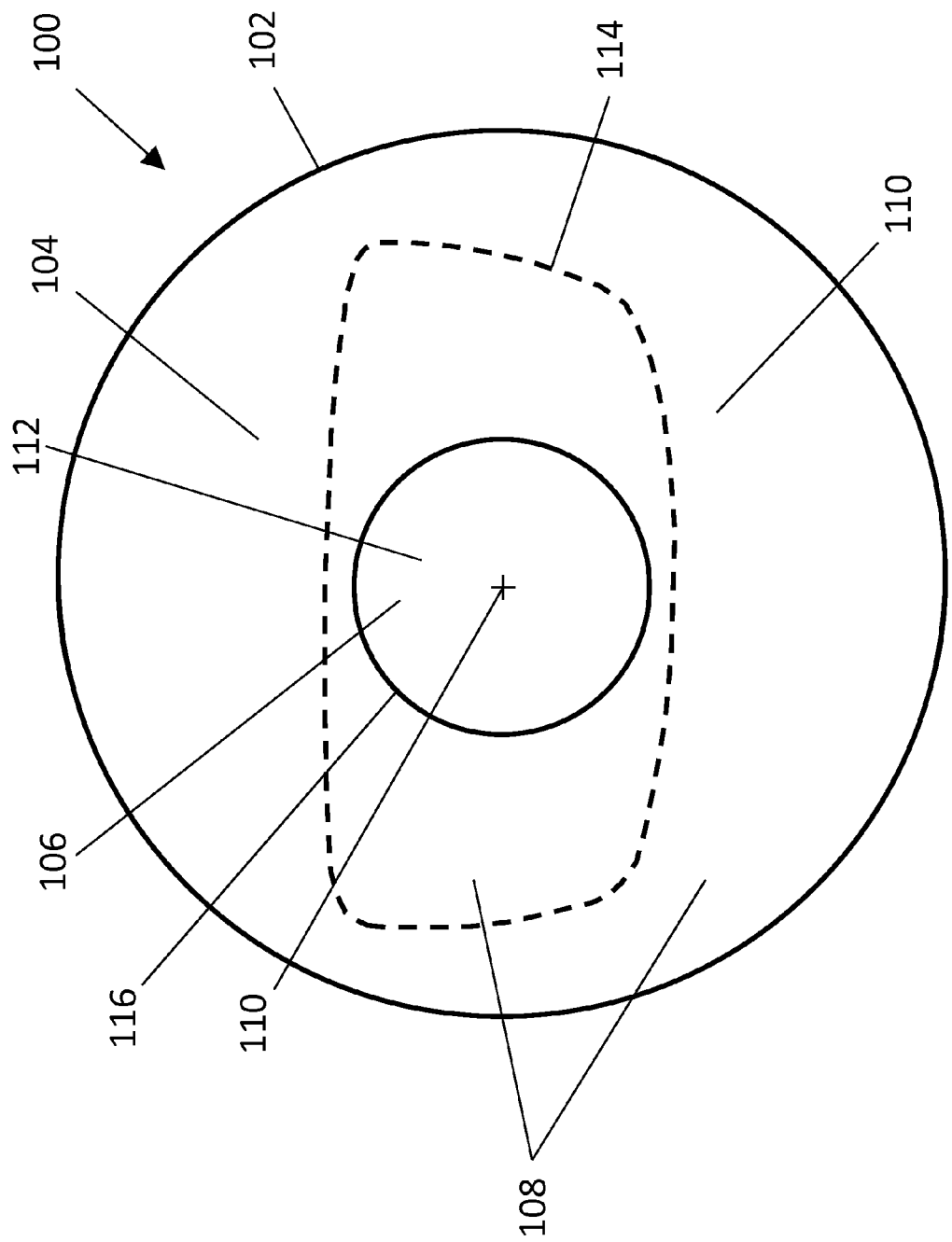
FIG. 1 illustrates a front view of a lens blank according to an embodiment.

FIG. 1 illustrates a front view of a lens blank 100. Lens blank 100 includes a rigid lens 102 and a semi-flexible inflatable membrane 104 attached to rigid lens 102. Lens blank 100 may be used as a fluid lens when supplied with an intervening fluid. For example, the term "fluid lens" may describe the optical lens formed by a fluid layer and surfaces containing the fluid, such as rigid lens 102 and membrane 104. In some embodiments, such a fluid lens may rely upon hydrostatic pressure of the fluid to cause a change in curvature of membrane 104, which may thereby alter the optical power of the fluid lens.

Rigid lens 102 may be made of glass, plastic, or other suitable material. Other suitable materials include, for example and without limitation, Diethylglycol bisallyl carbonate (DEG-BAC), poly(methyl methacrylate) (PMMA), and a proprietary polyurea complex, trade name TRIVEX (PPG). The lenses may be made of an impact resistant polymer and may have a scratch resistant coating or an anti-reflective coating.

In some embodiments, rigid lens 102 may be in the form of a single vision lens comprising a base curve and a fixed optical power. Rigid lens 102 may have a positive, negative, or zero fixed optical power as desired. In some embodiments, the fixed optical power of rigid lens 102 is in the range from about −1 D to about +1 D. In some embodiments, the curvature of a front surface of rigid lens 102 may be the same as a curvature of a back surface of rigid lens 102, which may result in a substantially zero optical power. In some embodiments, rigid lens 102 may be convex, concave, spherical, and/or aspheric in shape. In some embodiments, rigid lens 102 may include a compensation to its front or back surface to provide a desired optical power at a predetermined level of inflation. The compensation of rigid lens 102 can, for example, be designed based on factors such as the geometry of membrane 104, the desired level of inflation, or any combination thereof or other suitable factors. Rigid lens 102 may have a diameter ranging from about 55 mm to about 95 mm. In some embodiments, the diameter of rigid lens 102 may range from about 60 mm to about 90 mm.

Membrane 104 may be made of a semi-flexible, transparent, water impermeable material, such as, for example and without limitation, clear and elastic polyolefins, polyhalocarbons, polycycloaliphatics, polyethers, polyesters, polyimides and polyurethanes, for example, polyvinylidene difluoride or dichloride films. Other polymers suitable for use as membrane materials include, for example and without limitation, polysulfones, polyurethanes, polythiourethanes, polyethylene terephthalate, polymers of cycloolefins and aliphatic or alicyclic polyethers. Membrane 104 may be made of a biocompatible impermeable material, such as a cyclo-aliphatic hydrocarbon. In some embodiments, the thickness of membrane 104 may range from about 10 microns to 2.0 mm. The fluid used in the fluid lens may be a colorless fluid, for example air or distilled water. In some embodiments, the fluid is tinted, depending on the application. One example of fluid that may be used is manufactured by Dow Corning of Midland, Mich., under the name "diffusion pump oil," which is also generally referred to as "silicone oil." In some embodiments, the fluid may be an aliphatic polysiloxane having a refractive index matching the lens material. In some embodiments, the fluid comprises at least one photochromic additive.

Lens blank 100 is divided into a cavity zone 106 and a bonded zone 108. In certain embodiments, cavity zone 106 extends radially outward from central area 110 of lens blank 100. Central area 110 is shown in FIG. 1 as being in the exact center of lens blank 100. In some embodiments, central area 110 may be offset from the exact center of lens blank 100 in a desired location. Within cavity zone 106, a cavity is formed between membrane 104 and rigid lens 102. The cavity is configured to be at least partially filled with fluid. As the cavity is filled with fluid, the optical power of the fluid lens is determined by the combination of surface topography of the optical surfaces and their spacings and refractive indices of the optical components of the fluid lens, represented by the two surfaces of the rigid lens, the two surfaces of the fluid and the two surfaces of the membrane. As the volume of fluid is altered in the cavity, membrane 104 may inflate or deflate. This inflation may serve to alter the optical power of the fluid lens. In some embodiments, there is a direct and proportional relationship between the change in power of a fluid lens and the level of inflation effected.

In some embodiments, bonded zone 108 extends radially outward from cavity zone 106. In some embodiments, bonded zone 108 extends to a peripheral edge of rigid lens 102. In some embodiments, bonded zone 108 does not extend to a peripheral edge of rigid lens 102. In some embodiments, membrane 104 extends beyond and overhangs rigid lens 102. Throughout bonded zone 108, membrane 104 is bonded and fluidly sealed to rigid lens 102. In some embodiments, membrane 104 is bonded directly to rigid lens 102. In some embodiments, a layer of material, such as a stiffening layer, is sandwiched between membrane 104 and rigid lens 102. In some embodiments, this bond provides a seal between membrane 104 and rigid lens 102 that provides an environmentally robust diffusion barrier to the fluid in the cavity. Membrane 104 may be bonded to rigid lens 102 in various ways. In some embodiments, membrane 104 is bonded to rigid lens 102 via a heat seal. In some embodiments, membrane 104 is bonded to rigid lens 102 via laser welding. In some embodiments, membrane 104 is bonded to rigid lens 102 via adhesive. Other bonding options may also be used without departure from the spirit and scope of the present invention.

In some embodiments where adhesive is used to bond membrane 104 to rigid lens 102, the adhesive is index-matched to membrane 104, the fluid, and rigid lens 102. For example, in some embodiments, the refractive index of the rigid lens, the membrane, and the fluid are equal at least to three significant figures, such as 0.002 units at one or more wavelengths, such as at 550 nm. In some embodiments, the refractive indexes of each of the various components are in a range from about 1.47 to about 1.78 measured at about 550 nm. In some embodiments, the refractive indexes of each of the various components are in a range from about 1.52 to about 1.70 measured at about 550 nm. In some embodiments, a refractive index of the adhesive and a refractive index of rigid lens 102 do not differ by more than about 0.05 units. In some embodiments, a refractive index of the adhesive and a refractive index of membrane 104 do not differ by more than about 0.05 units. In some embodiments, a refractive index of the adhesive and a refractive index of the fluid do not differ by more than about 0.05 units. In some embodiments, a refractive index of membrane 104, a refractive index of the fluid, a refractive index of rigid lens 102, and a refractive index of the adhesive do not differ by more than about 0.05 units.

In some embodiments, bonded zone 108 is in the shape of a loop, such as a circular or elliptical ring. In some embodiments, bonded zone 108 may be a desired non-geometric loop shape. Bonded zone 108 is dimensioned so as to have a bonded loop area with a width and height corresponding to any common spectacle lens size. One example of a common spectacle lens shape is shown in dashed line outline 114. Other common spectacle lens shapes may include, for example, circles, ellipses, rectangles with rounded corners, or irregular shapes. In some embodiments where bonded zone 108 is in the shape of a ring, a width of the ring can range from about 18 mm to about 40 mm. In some embodiments, the width of the ring can vary across the surface of the lens. In some embodiments, common spectacle lens shapes may be accommodated with a bonded zone 108 having a width in a range from about 6 mm to about 24 mm. In some embodiments, common spectacle lens shapes may be accommodated with a bonded zone 108 having a width in a range from about 6 mm to about 18 mm. In some embodiments, the range of "A" dimensions (nasal-temporal dimensions) of common spectacle frames may be accommodated with a bonded zone 108 having a width in a range from about 26 mm to about 48 mm. In some embodiments, the range of "B" dimensions (vertical dimensions) of common spectacle frames may be accommodated with a bonded zone 108 having a width in a range from about 18 mm to about 30 mm. In some embodiments, a range of interpupillary distances that may be accommodated is in a range from about 45 mm to about 75 mm.

An inner peripheral edge 116 of bonded zone 108 may be in the shape of a circle. In some other embodiments, inner peripheral edge 116 is in the shape of an oval, rectangle, or an irregular pattern. In some embodiments, bonded zone 108 is dimensioned to form a loop that may be trimmed to form a smaller bonded loop having any outside loop width from about 25 mm to about 48 mm and any outside loop height from about 18 mm to about 30 mm.

Figure 2:
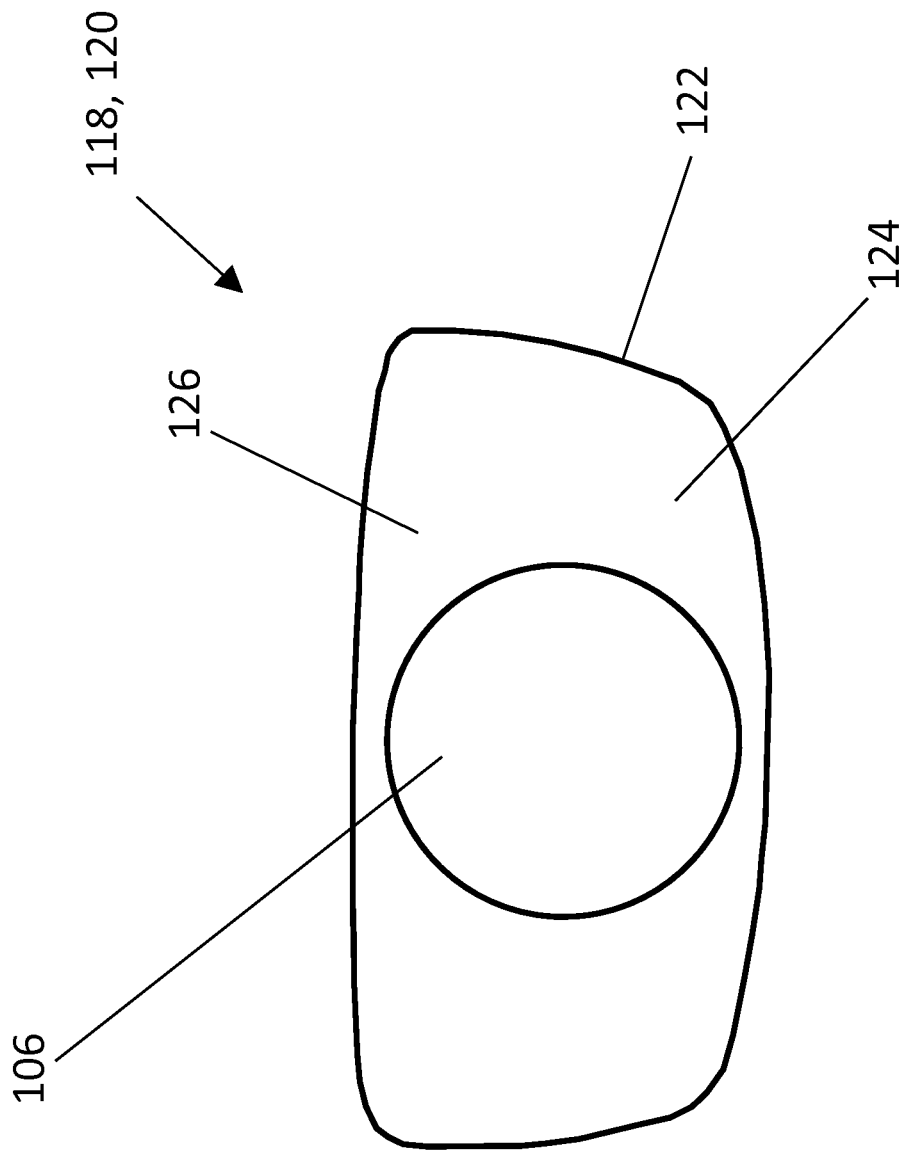
FIG. 2 illustrates a front view of a spectacle lens according to an embodiment.

FIG. 2 illustrates a front view of a spectacles lens 118 in the form of a trimmed lens 120. Trimmed lens 120 is formed via a manufacturing operation that trims lens blank 100 to a typical spectacle shape and size. Lens blank 100 may be trimmed by any suitable cutting and/or machining method, such as, for example, through a glass cutter, saw, drill, scissors, knife, laser, plasma cutter, or water jet cutter. Because trimmed lens 120 is merely trimmed from lens blank 100 within bonded zone 108, trimmed lens 120 will result in a trimmed rigid lens 122 and a trimmed membrane 124 attached to trimmed rigid lens 122. Like lens blank 100, trimmed lens 120 is divided into cavity zone 106 and a trimmed bonded zone 126. Cavity zone 106 is the same size and shape as cavity zone 106 on lens blank 100. Trimmed bonded zone 126 extends to a peripheral edge of trimmed rigid lens 122. Like bonded zone 108 on lens blank 100, throughout trimmed bonded zone 126, trimmed membrane 124 is bonded and fluidly sealed to trimmed rigid lens 122. This configuration allows for a fluid seal between trimmed membrane 124 and trimmed rigid lens 122, thereby preventing fluid from leaking out from cavity zone 106.

In trimmed lens 120, the optical power of the fluid lens includes a variable portion corresponding to cavity zone 106 and a fixed portion corresponding to trimmed bonded zone 126. In some embodiments, trimmed membrane 124 is transparent and does not provide a substantial optical power. In some embodiments, the optical power of the fixed portion is provided only by trimmed rigid lens 122. In some embodiments, the optical power of the variable portion is provided by a combination of trimmed rigid lens 122 and the cavity. In some embodiments, the optical power of the variable portion ranges from about −1.0 D in an uninflated state to about +1.0 D in an inflated state. In some embodiments, the optical power of the variable portion ranges from about +0.25 D in an uninflated state to about +4.0 D in an inflated state. In some embodiments, the optical power of the variable portion ranges from about −12.00 D in an uninflated state to about +12.0 D in an inflated state.

Figure 13:
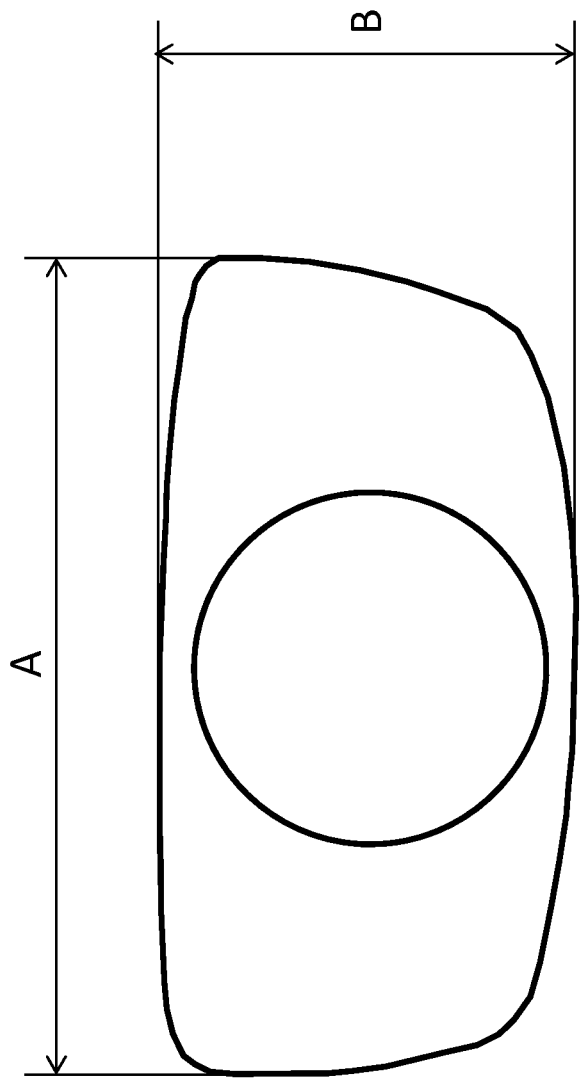
FIG. 13 illustrates a front view of the spectacle lens of FIG. 2 with added dimension labels.

FIG. 13 illustrates a front view of an exemplary trimmed lens with added dimension labels "A" and "B". Dimension "A" identifies a trimmed lens width. Suitable values for this dimension include, but are not limited to, values ranging from approximately 30 mm to approximately 60 mm. Dimension "B" identifies a trimmed lens height. Suitable values for this dimension include, but are not limited to, values ranging from approximately 20 mm to approximately 40 mm.

Figure 3:
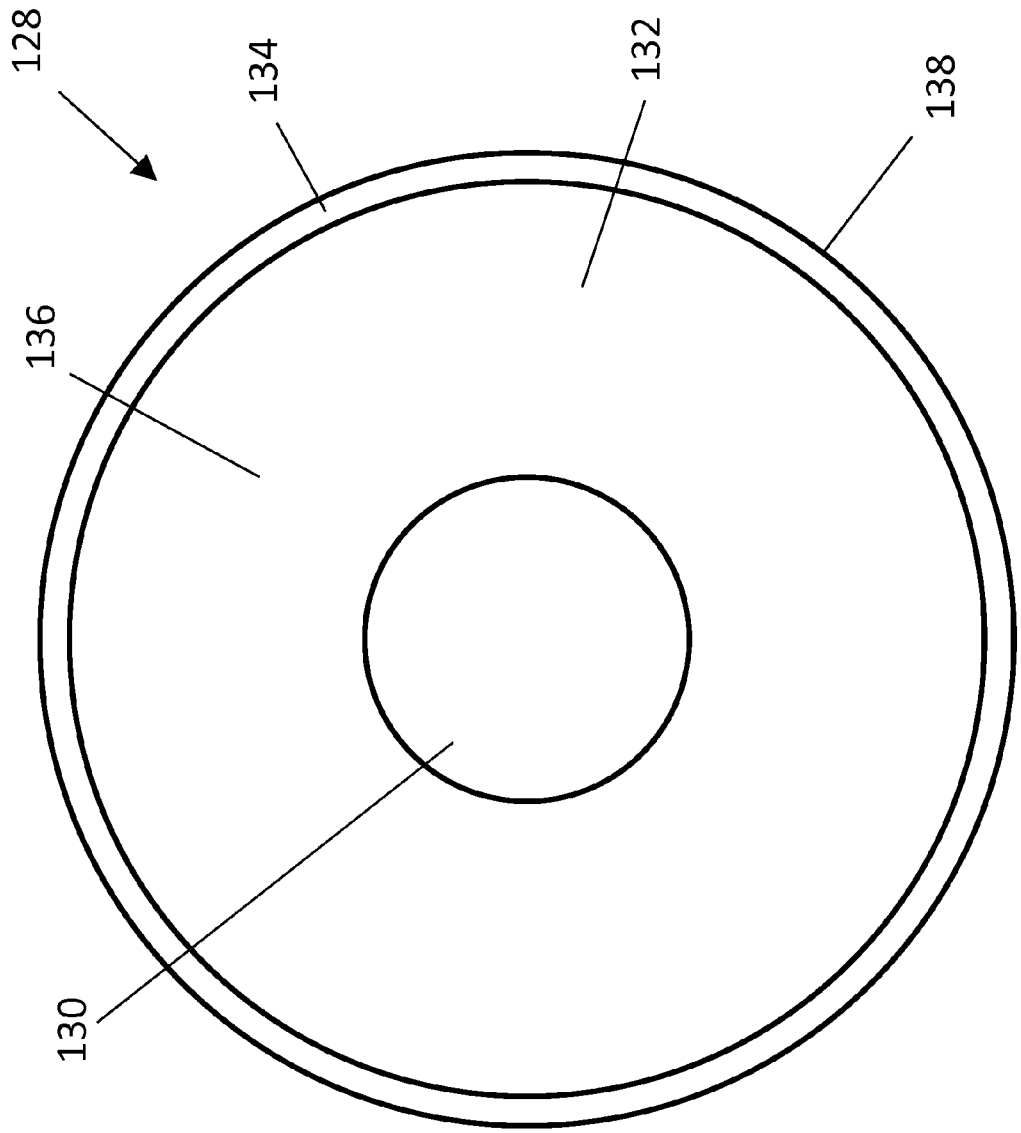
FIG. 3 illustrates a front view of a lens blank according to an embodiment.

FIG. 3 illustrates a front view of lens blank 128 according to an embodiment. In this embodiment, membrane 136 does not extend to a peripheral edge of rigid lens 138. This may occur because the membrane may not be precisely the same size or shape of the rigid lens or may not be perfectly aligned with the rigid lens during the manufacturing process of the lens blank. In some embodiments, a membrane of a different size, shape, and/or alignment compared to the rigid lens is desired. This configuration divides lens blank 128 into three zones—cavity zone 130, bonded zone 132, and outer zone 134. In some embodiments, cavity zone 130 and bonded zone 132 are similar to their respective zones in FIG. 1. Outer zone 134 extends radially outward from a peripheral edge of membrane 136 to a peripheral edge of rigid lens 138. In some embodiments, outer zone includes only rigid lens 138. In some embodiments, outer zone 134 has a width along a surface of rigid lens 138 from about 2 mm to about 10 mm. In some embodiments, outer zone 134 has a width along a surface of rigid lens 138 from about 3 nm to about 6 mm.

Figure 4:
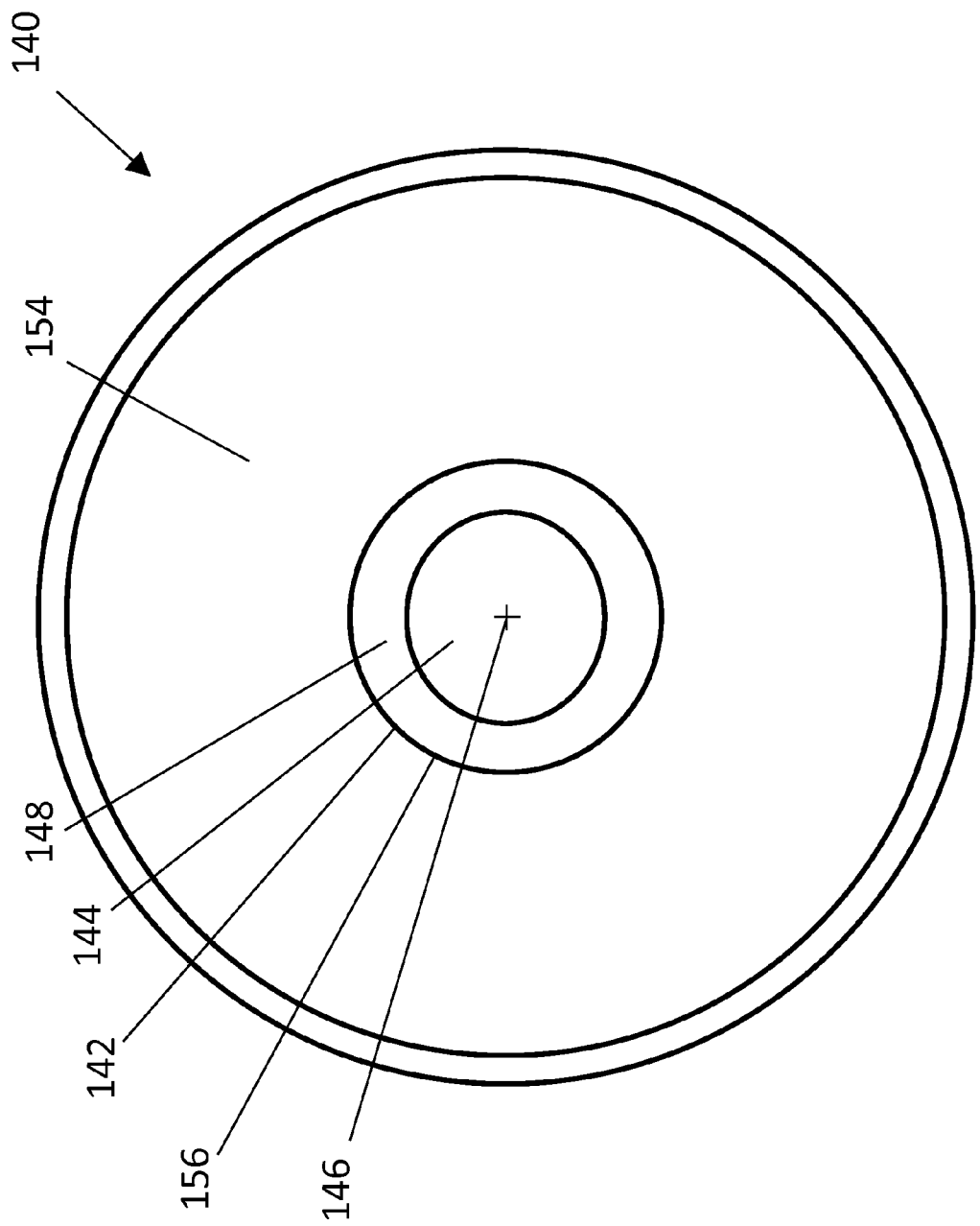
FIG. 4 illustrates a front view of a lens blank according to an embodiment.

FIG. 4 illustrates a front view of lens blank 140 according to an embodiment. Like lens blank 100 of FIG. 1, lens blank 140 is divided into a cavity zone and a bonded zone. Cavity zone 142 of lens blank 140 is sub-divided into an aspheric sub-zone 144 extending radially outward from central area 146 of cavity zone 142, and a spherical sub-zone 148 extending radially outward from aspheric sub-zone 144 to bonded zone 150. The curvature of rigid lens 152 within aspheric sub-zone 144 is aspheric and the curvature of rigid lens 152 within spherical sub-zone 148 is spherical. Aspheric sub-zone 144 is in the shape of a circle. In other embodiments, aspheric sub-zone 144 is in the shape of an oval, rectangle, or non-geometric shape. In some embodiments, spherical sub-zone 148 may act as a blending zone that utilizes inflation of membrane 154 to provide a continuous blend of curvatures from the edge of aspheric sub-zone 144 to bonded zone 150.

In some embodiments, the thickness of membrane 154 within aspheric sub-zone 144 may be contoured to offset the asphericity of rigid lens 152 within aspheric sub-zone 144. In some embodiments, the term "contoured" may denote variation in a mechanical dimension, such as thickness, a mechanical property, such as sag; or an optical property, such as astigmatism or power in the x, y plane. In some embodiments, a contoured thickness may modulate the extent of inflation over the overall surface area in order to bring an inner peripheral edge 156 to a fixed periphery of the fluid lens, which may be defined by a desired frame geometry. In some embodiments, the contour offsets the asphericity of rigid lens 152 when membrane 154 is both inflated and uninflated. In some embodiments, the contour offsets the asphericity of rigid lens 152 only when membrane 154 is inflated or uninflated.

In some embodiments, the area of aspheric sub-zone 144 may range from about 100 mm$^2$ to about 600 mm$^2$. In some embodiments, the area of aspheric sub-zone 144 may range from about 180 mm$^2$ to about 450 mm$^2$. In some embodiments, aspheric zone 144 is in the shape of a continuous convex polynomial, such as an ellipse or circle. In some embodiments, aspheric sub-zone 144 may be in the shape of a desired irregular shape. In some embodiments where aspheric sub-zone 144 is in the shape of an ellipse, the ellipse may have an eccentricity in a range from about 0.95 to about 0.50. In some embodiments, the ellipse may have an eccentricity in a range from about 0.95 to about 0.65.

In some embodiments, a vertical dimension of aspheric sub-zone 144 is determined based on a potential vertical movement of a pupil. For example, the vertical dimension of the aspheric sub-zone can be determined based on the point of regard of the human eye along the principal meridian of the optic following a path of the pupil when gazing directly forward. In some embodiments, this vertical dimension may be approximately 25 mm. In some embodiments, the vertical dimension may be in the range from about 18 mm to about 24 mm.

In some embodiments, spherical sub-zone 148 is in the shape of a continuous convex polynomial, such as an ellipse or circle. In some embodiments, spherical sub-zone 148 may be in the shape of a desired irregular shape. In some embodiments where spherical sub-zone 148 is in the shape of a circle, the circle may have a radius in a range from about 10 mm to about 30 mm. In some embodiments, the circle may have a radius in a range from about 12 mm to about 24 mm.

Figure 14:
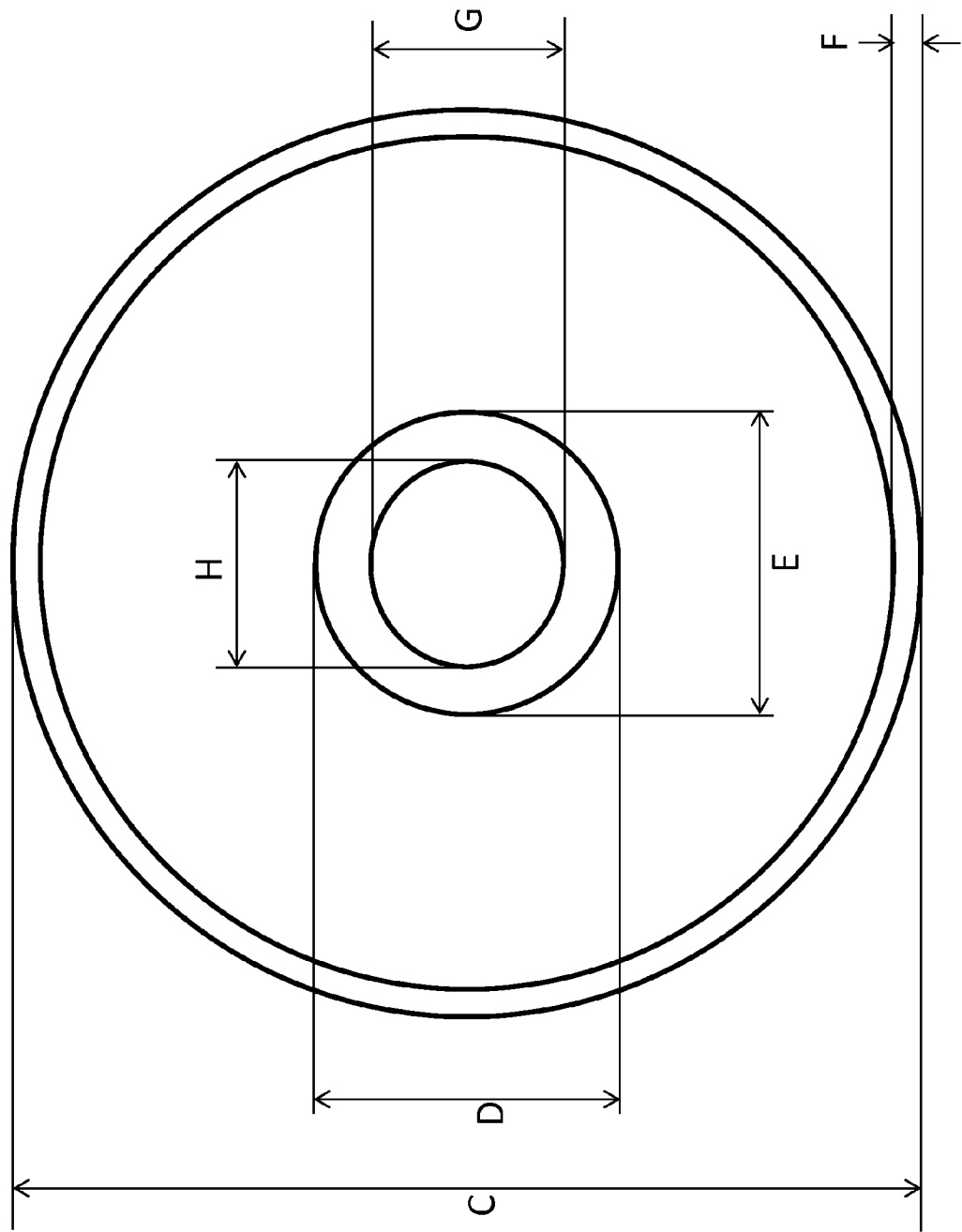
FIG. 14 illustrates a front view of the lens blank of FIG. 4 with added dimension labels.

FIG. 14 illustrates a front view of an exemplary lens blank with added dimension labels "C" through "H".

Dimension "C" identifies a lens blank diameter. Suitable values for this dimension include, but are not limited to, values ranging from approximately 60 mm to approximately 95 mm.

Dimension "D" identifies a cavity zone height. Suitable values for this dimension include, but are not limited to, values ranging from approximately 10 mm to approximately 30 mm.

Dimension "E" identifies a cavity zone width. Suitable values for this dimension include, but are not limited to, values ranging from approximately 20 mm to approximately 40 mm.

Dimension "F" identifies a width between a membrane and an edge of the lens blank. Suitable values for this dimension include, but are not limited to, values ranging from approximately 1 mm to approximately 30 mm.

Dimension "G" identifies an aspheric sub-zone height. Suitable values for this dimension include, but are not limited to, values ranging from approximately 10 mm to approximately 20 mm.

Dimension "H" identifies an aspheric sub-zone width. Suitable values for this dimension include, but are not limited to, values ranging from approximately 12 mm to approximately 30 mm.

Figure 5:
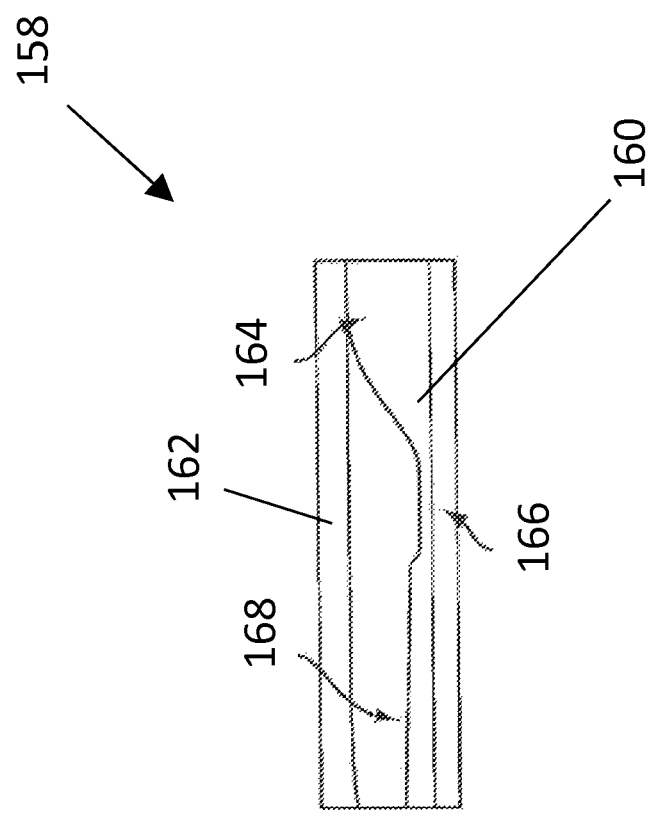
FIG. 5 illustrates a cross-sectional view of a portion of a lens blank according to an embodiment.

FIG. 5 illustrates a cross-sectional view of a fluid lens 158 according to an embodiment. As described in U.S. application Ser. No. 13/407,416, which is incorporated herein by reference in its entirety, membrane 160 may be attached to rigid lens 162 and include a thick zone 164, a hinge-like section 166, and a center disk area 168. In some embodiments, center disk area 168 may be configured to provide for a substantially constant spherical power greater than approximately 2.0 diopters over a substantially full field of view of a user along the horizontal axis. For example, the full field of view of the user may be approximately 50 mm along the horizontal axis centered at an optical center of fluid lens 158.

In some embodiments, hinge-like section 166 may accommodate a non-planar geometry of an inflated membrane 160 while still remaining attached to rigid lens 162. In some embodiments, hinge-like section 166 may facilitate full inflation of membrane 160 corresponding to a target power range, while minimizing stresses transferred to a thick zone 164 that would cause astigmatism to build. In some embodiments, hinge-like section 166 may allow sag changes to be "absorbed" without causing substantial optical distortion in both the center disk area 168 and thick zone 164 of membrane 160. In some embodiments, the use of a hinge-like section, such as hinge-like section 166, may make it possible to effectively isolate optical properties of membrane 160 within individual sections. A hinge having a high aspect ratio, which may be defined as the ratio of the width to its thickness, may be particularly effective.

In some embodiments, thick zone 164 has a thickness of approximately 1 mm, and center disk area 168 has a thickness of approximately 0.225 mm. In some embodiments, center disk area 168 has a diameter of approximately 12 mm, and the disk edge has a diameter of approximately 23.2 mm. Hinge-like section 166 may be formed between thick zone 164 and center disk area 168. In some embodiments, fluid lens 158 may provide for an approximately 22 degree gaze angle between the center of center disk area 168 and the disk edge. In some embodiments, fluid lens 158 may be configured for use with a frame in the shape of a rounded rectangle, approximately 55 mm by 25 mm in size. This configuration may provide acceptable optical performance in center disk area 168 while maintaining acceptable properties to the edge of the frame.

The term "central optical zone" may be used to denote a viewing zone in the fluid lens centered on an optic axis corresponding to the location of a user's eye. In some embodiments, the optic axis is aligned to the center of the pupil of an average or individual wearer. In some embodiments, the optical zone is approximately 15 mm wide (along the x axis) and approximately 12 mm high (along the y axis), which may correspond to a horizontal gaze angle of approximately +/−15 degrees and a vertical gaze angle of approximately +/−12 degrees.

In some embodiments, center disk area 168 in membrane 160 has a degree of eccentricity of approximately 0.9. That is, the horizontal width is approximately 1.11 times bigger than the vertical width. This design pushes the location of the transition zone corresponding to the hinge-like section to greater gaze angles in the horizontal direction, where it places lesser constraints upon visual width and horizontal eye movements. In some embodiments, a vertical cross-section thickness is approximately 0.200 mm, a width is approximately 3.7 mm, and an aspect ratio is approximately 1:18.5. In some embodiments, the horizontal cross-section thickness is approximately 0.2 mm, with a corresponding width of approximately 1.45 mm, and an aspect ratio of approximately 1:7.

Hinge width, among other design parameters, may be adjusted as desired. For example, in some embodiments, a combination of a wider hinge along the Y-axis and a thinner hinge along the horizontal axis may serve to reduce astigmatism induced by inflation. In some embodiments, the width may be in the range from about 0.1 mm to about 2.5 mm. In some embodiment, the thickness of hinge-like section 166 ranges from about 0.01 mm to about 0.25 mm. In some embodiments, the thickness of the hinge section ranges from about 0.07 mm to about 0.20 mm. For gaze angles that may be used for near vision (e.g., from about 0 to about 15 degrees), this configuration may provide for target image quality (e.g., having a blur circle at the retina of approximately 10 microns, corresponding to approximately 0.5 D of astigmatism, or an approximately spherical equivalent 0.25 D of image blur).

Some embodiments described herein show a relatively stable level of spherical power and astigmatism along the horizontal axis, with a relatively shorter range of spherical power and astigmatism along the vertical axis. As one example, the lens may be configured such that the spherical power varies less than approximately 0.25 diopters over approximately 10 mm (+/− approximately 5 mm) from the optical center. In some embodiments the lens is configured such that the spherical power varies less than approximately 0.25 diopters over approximately 20 mm (+/− approximately 10 mm) from the optical center. In some embodiments, the spherical power and/or astigmatism along the vertical axis may have an equal or greater range compared to the horizontal axis. One measure of optical performance may be the magnitude of induced astigmatism along the horizontal axis. In some embodiments, induced astigmatism may be less than approximately 0.5 diopters over at least approximately 10 mm along the horizontal axis (+/− approximately 5 mm) from the optical center, and in some embodiments, over approximately 20 mm (+/− approximately 10 mm) from the optical center.

Figure 6:
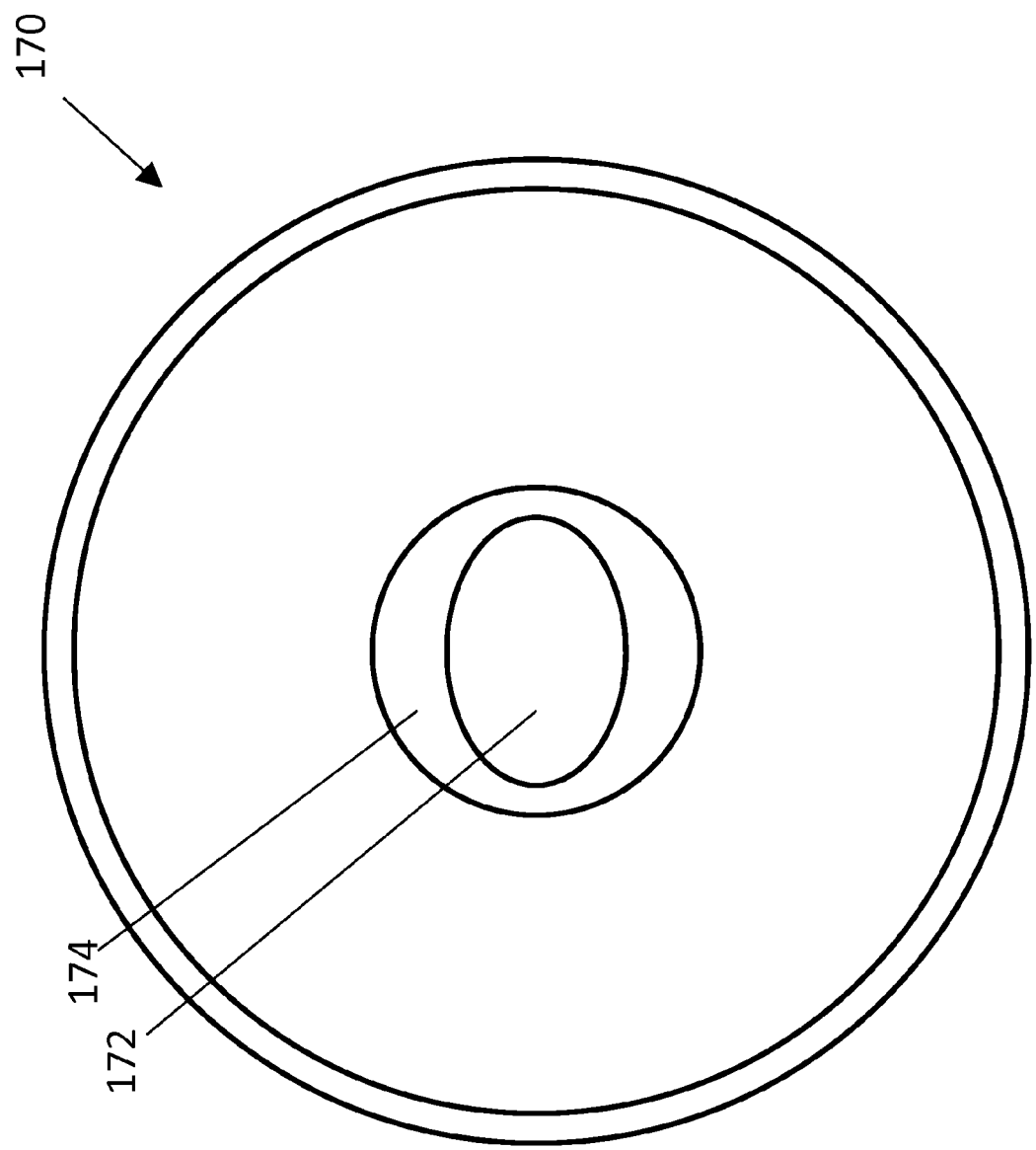
FIG. 6 illustrates a front view of a lens blank according to an embodiment.
Figure 7:
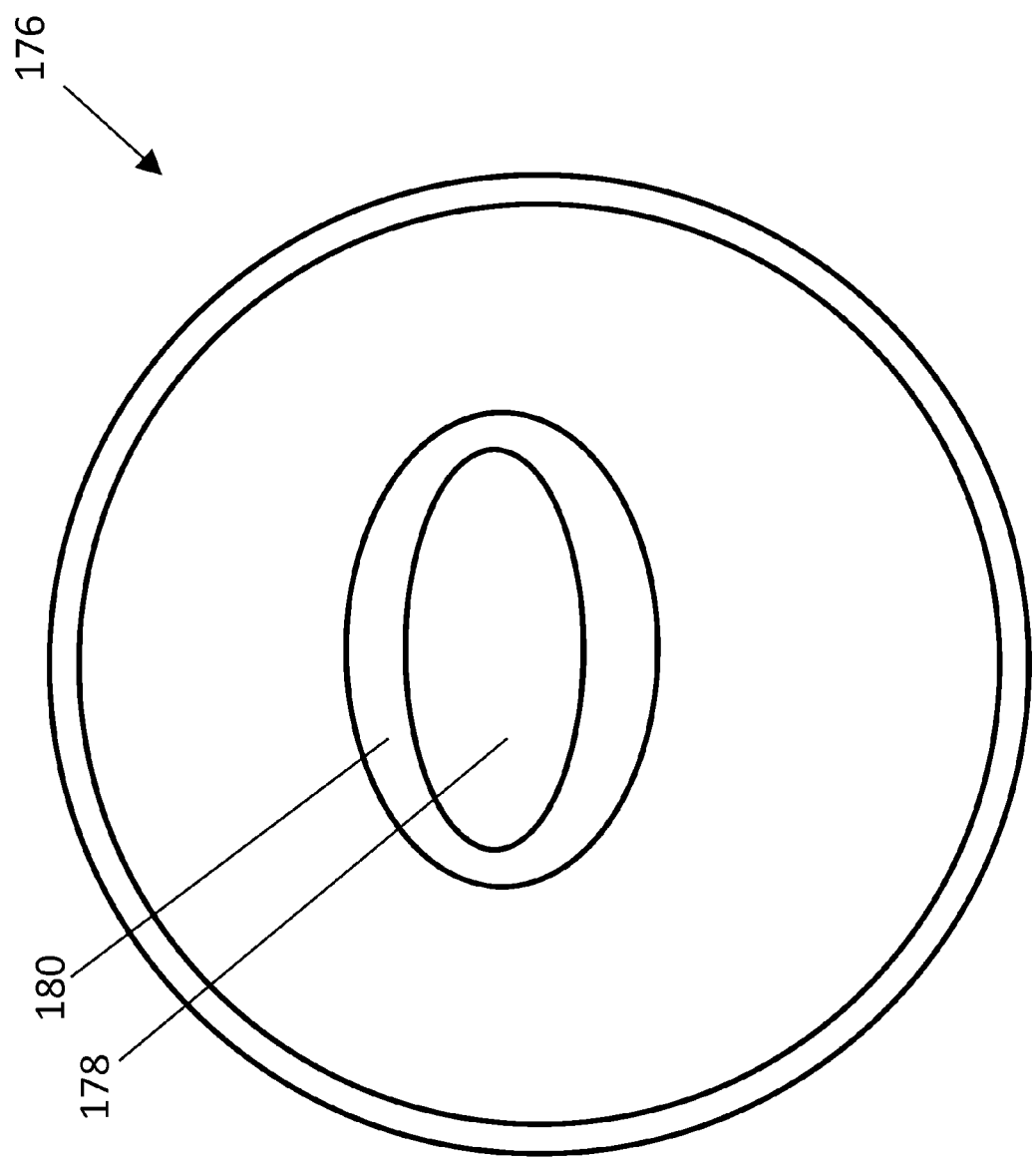
FIG. 7 illustrates a front view of a lens blank according to an embodiment.
Figure 8:
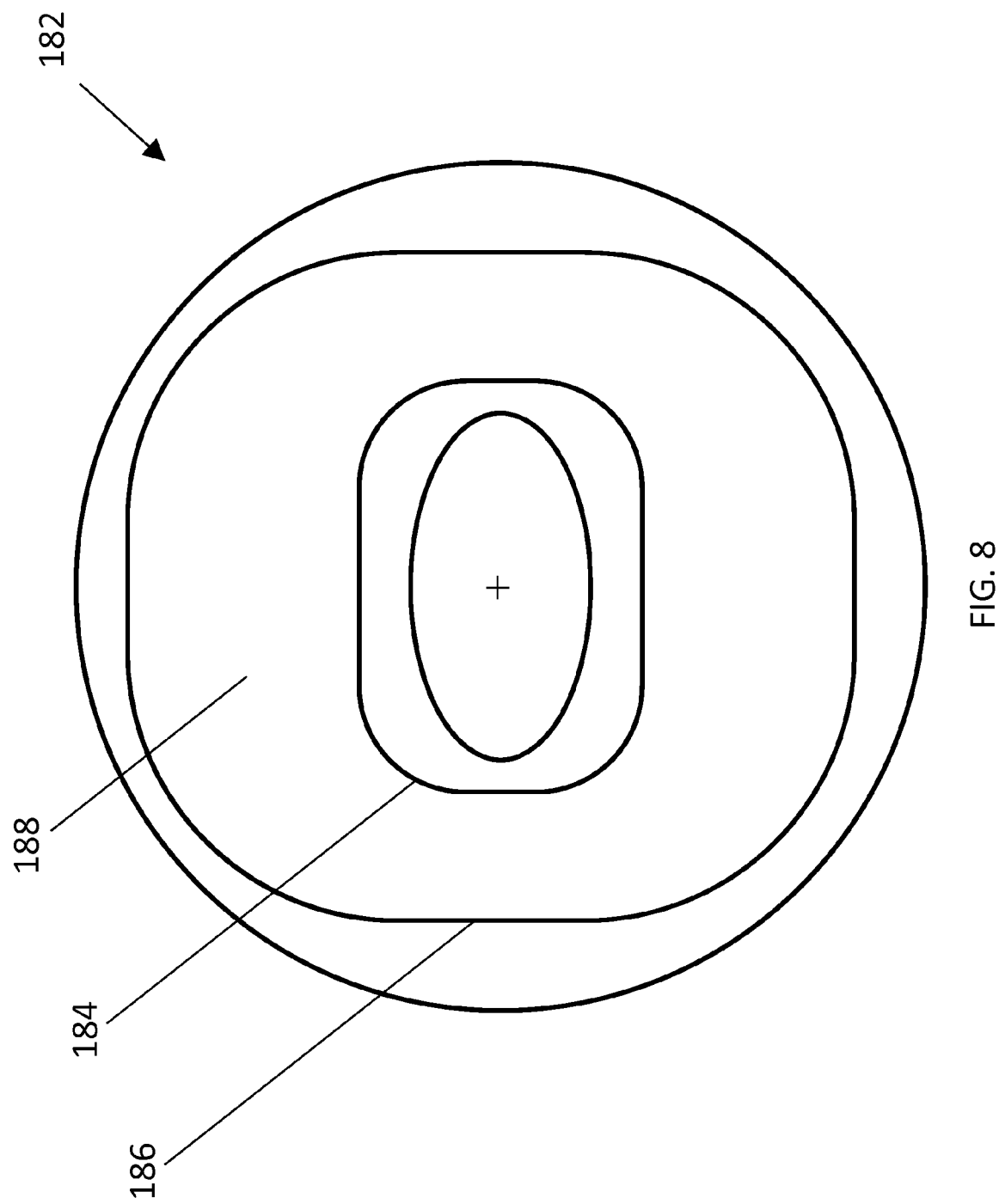
FIG. 8 illustrates a front view of a lens blank according to an embodiment.

FIGS. 6-8 illustrate alternative embodiments of lens blanks. FIG. 6 illustrates a front view of lens blank 170 according to an embodiment, wherein aspheric sub-zone 172 is in the shape of an oval and spherical sub-zone 174 is in the shape of a circle. FIG. 7 illustrates a front view of lens blank 176 according to an embodiment wherein both aspheric sub-zone 178 and spherical sub-zone 180 is in the shape of an oval. FIG. 8 illustrates a front view of lens blank 182 according to an embodiment wherein both an inner peripheral edge 184 and an outer peripheral edge 186 of bonded zone 188 are rectangular with rounded corners.

Figure 9:
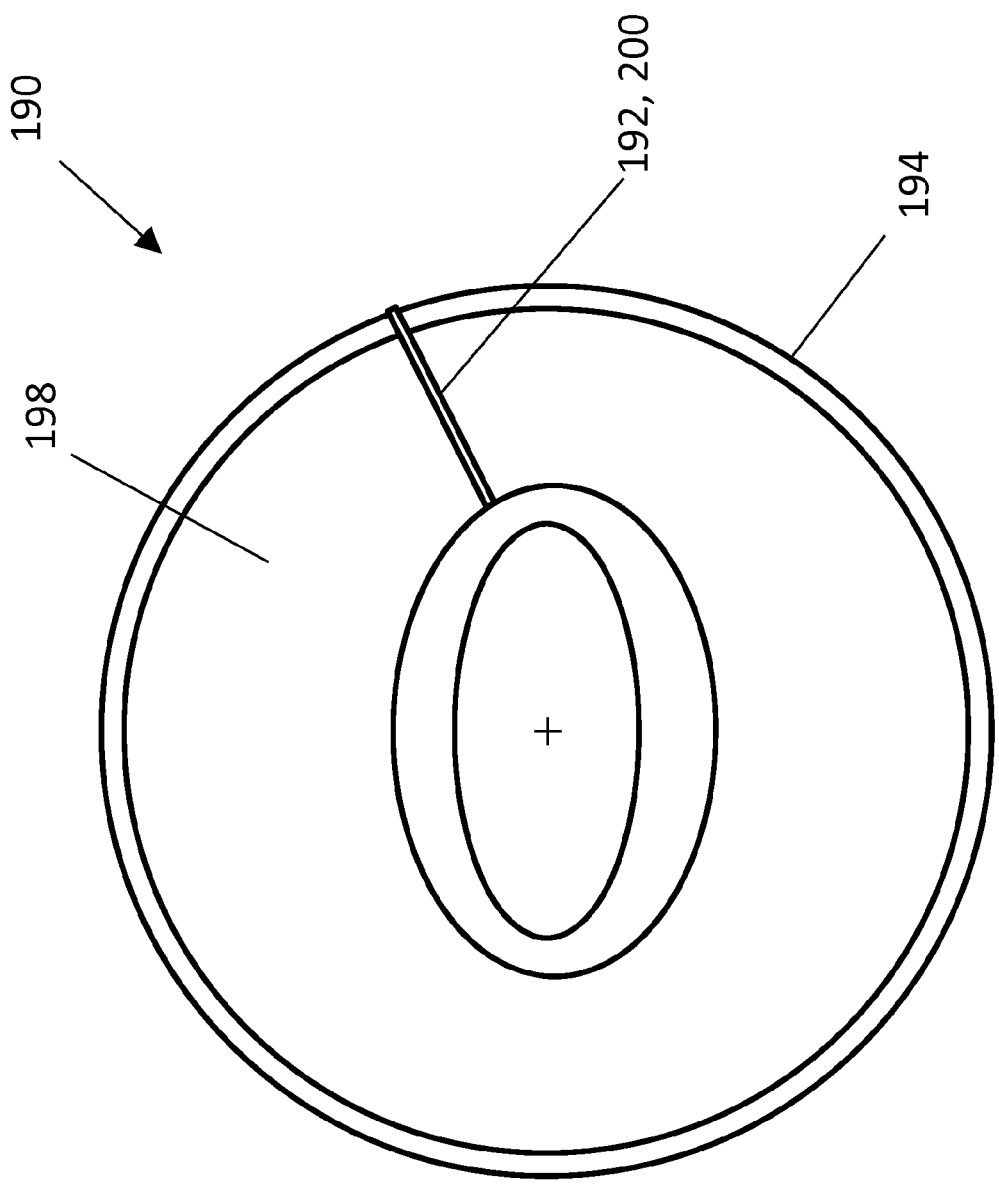
FIG. 9 illustrates a front view of a lens blank according to an embodiment.

FIG. 9 illustrates a front view of lens blank 190 according to an embodiment. Lens blank 190 includes a channel 192 formed within rigid lens 194. In some embodiments, channel 192 may allow access to a cavity to exchange fluid between the cavity and a reservoir containing excess fluid in order to alter a hydrostatic pressure of the fluid inside the cavity. In some embodiments, channel 192 is configured to allow fluid to enter or exit the cavity to inflate or uninflate membrane 198. In some embodiments, channel 192 is connected to a reservoir via a connecting tube. In some embodiments, the fluid lens, channel, connecting tube, and reservoir together form a sealed unit.

In some embodiments, the reservoir may be compressed to push fluid out into the fluid lens via the connecting tube and/or channel. In some embodiments, the reservoir is compressed via a plunger impinging against a diaphragm to increase pressure within the reservoir. In some embodiments, the reservoir is compressed via a caliper. Other suitable configurations may be used. One or more suitable configurations are disclosed, for example, in U.S. Pat. No. 8,087,778 to Gupta, which is incorporated by reference herein in its entirety.

The reservoir may be incorporated into a temple piece, into a spectacles frame, or other desired location. The reservoir may be made of a flexible, transparent, water impermeable material. For example and without limitation, the reservoir may be made of Polyvinyledene Difluoride, such as Heat-shrink VITON®, supplied by DuPont Performance Elastomers LLC of Wilmington, Del., DERAY-KYF 190 manufactured by DSG-CANUSA of Meckenheim, Germany (flexible), RW-175 manufactured by Tyco Electronics Corp. of Berwyn, Pa. (formerly Raychem Corp.) (semi-rigid), or other suitable material. Additional embodiments of reservoirs are described in U.S. Publication No. 2011-0102735, which is incorporated herein by reference in its entirety.

Alternatively, or in addition, lens blank 190 may include a tube 200 disposed between membrane 198 and rigid lens 194. Tube 200 may be substantially rigid or substantially flexible as desired. In some embodiments, tube 200 is made of the same materials as the reservoir. In some embodiments, tube 200 is made of one or more materials, such as TYGON (polyvinyl chloride), PVDF (Polyvinyledene fluoride), and natural rubber. For example, PVDF may be suitable based on its durability, permeability, and resistance to crimping. Tube 200 may be transparent, translucent, or opaque. In some embodiments, tube 200 has substantially the same refractive index as one or more of rigid lens 194, membrane 198, and the fluid. Like channel 192, tube 200 may be configured to allow fluid to enter or exit the cavity to inflate or uninflate membrane 198. In an embodiment, tube 200 is inserted into channel 192.

Figure 10:
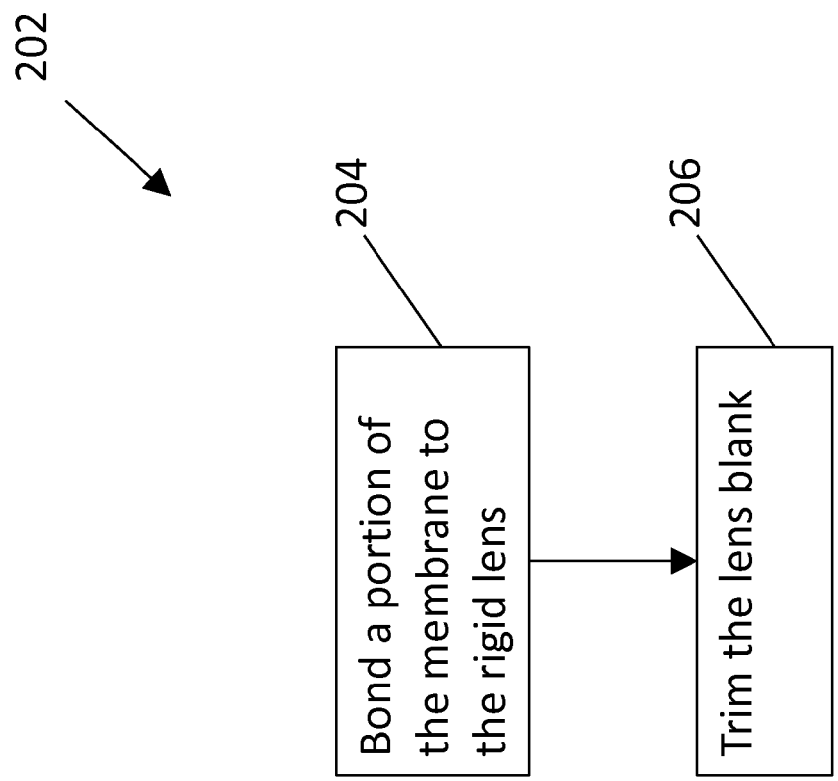
FIG. 10 shows a flow chart for a method of manufacturing a fluid lens assembly according to an embodiment.

FIG. 10 shows a flow chart 202 for a method of manufacturing a fluid lens assembly according to an embodiment. Reference is made to the fluid lens parts illustrated in FIGS. 1 and 2 for example only. That is, this method may be used to manufacture any suitable fluid lens described herein or otherwise.

In step 204, a portion of a membrane 104 is bonded to a rigid lens 102 so that the bonded area of membrane 104 is fluidly sealed to rigid lens 102. Any suitable bonding process may be used to bond the membrane to the rigid lens. For example, as described herein, in some embodiments, membrane 104 is bonded to rigid lens 102 via a heat seal. In some embodiments, membrane 104 is bonded to rigid lens 102 via laser welding. In some embodiments, membrane 104 is bonded to rigid lens 102 via adhesive. The bonded area is dimensioned such that a lens blank 100 may be trimmed to form a trimmed lens 120 having a bonded loop area with a width and height corresponding to any common spectacle lens size.

Step 206 includes trimming lens blank 100 to form a trimmed lens 120 having a bonded loop area with a width and height corresponding to a given spectacle lens size. As described herein, lens blank 100 may be trimmed to a given spectacle shape and size via any suitable cutting and/or machining method, such as, for example, through a glass cutter, saw, drill, scissors, knife, laser, plasma cutter, or water jet cutter.

Figure 11:
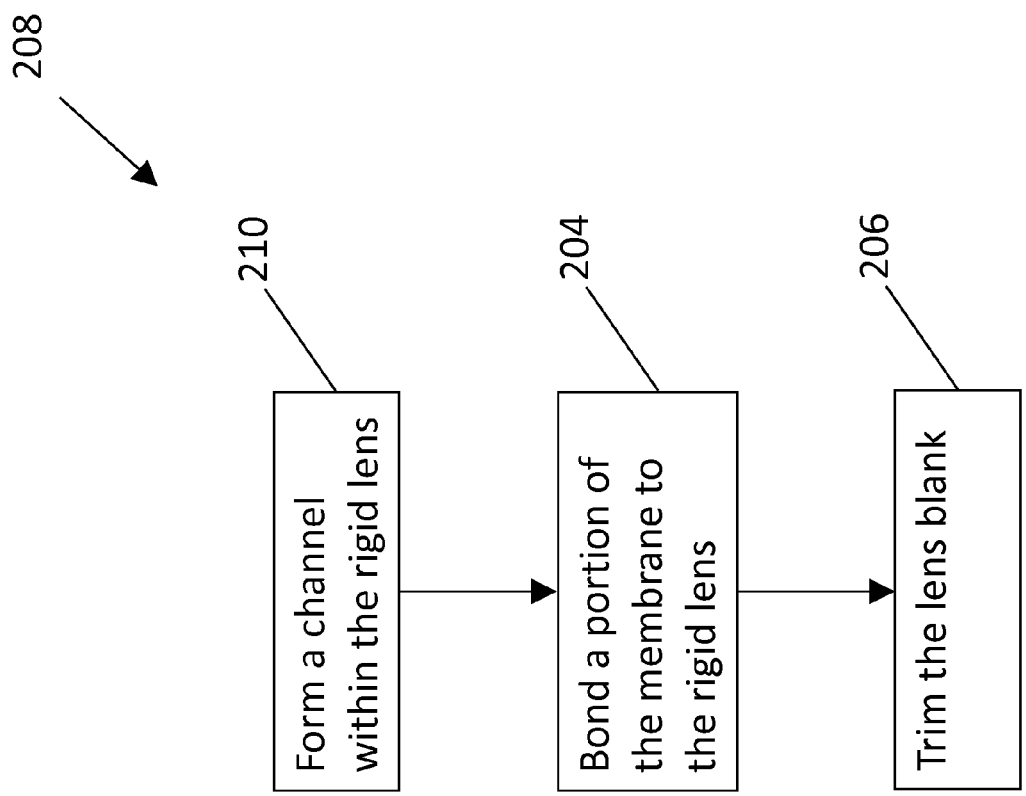
FIG. 11 shows a flow chart for a method of manufacturing a fluid lens assembly according to an embodiment.

FIG. 11 shows a flow chart 208 for a method of manufacturing a fluid lens assembly, according to an embodiment. Reference is made to the fluid lens parts illustrated in FIG. 9 for example only. That is, this method may be applied to manufacture any suitable fluid lens described herein or otherwise. Step 210 includes forming a channel 192 within a rigid lens 194. Channel 192 may be formed via any suitable machining method, such as, for example, through a glass cutter, saw, drill, scissors, knife, laser, plasma cutter, or water jet cutter. Channel 192 is configured to allow fluid to enter or exit a cavity to inflate or uninflate a membrane 198. In some embodiments, steps 204 and 206 of flow chart 208 will remain substantially the same as described herein for flow chart 202 in FIG. 10.

Figure 12:
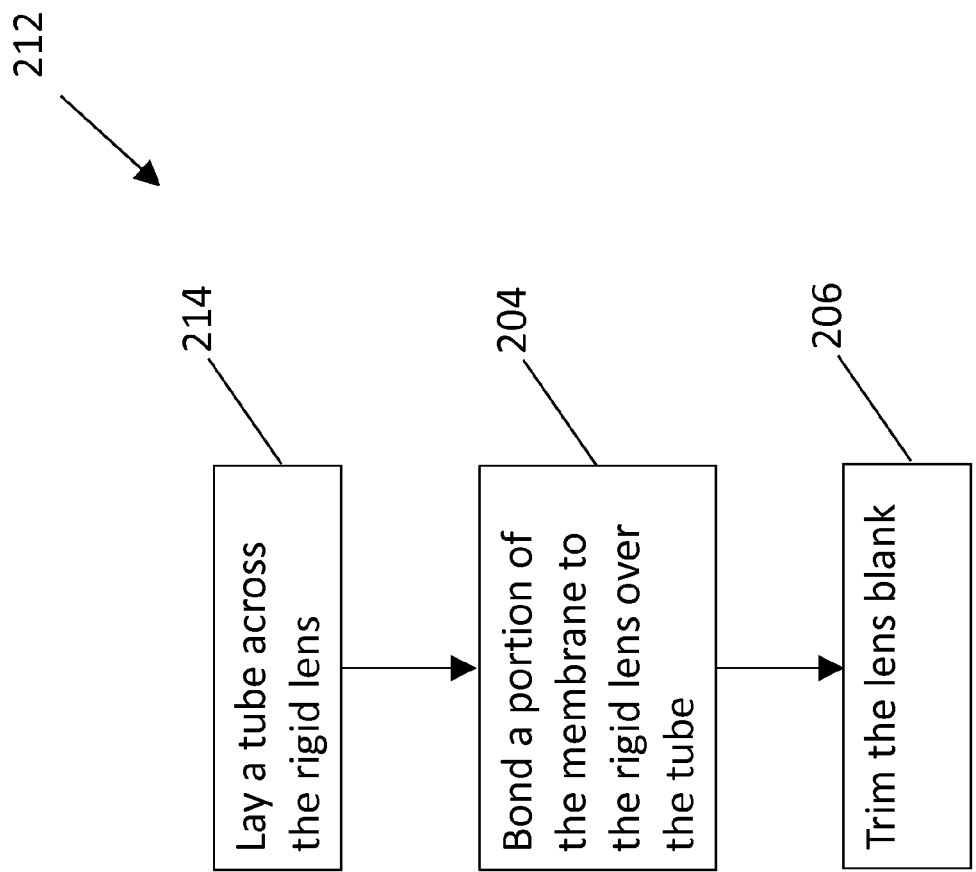
FIG. 12 shows a flow chart for a method of manufacturing a fluid lens assembly according to an embodiment.

FIG. 12 shows a flow chart 212 for a method of manufacturing a fluid lens assembly, according to an embodiment. Reference is made to the fluid lens parts illustrated in FIG. 9 for example only. That is, this method may be applied to manufacture any suitable fluid lens described herein or otherwise. Step 214 includes placing tube 200 between membrane 198 and rigid lens 194 before membrane 198 is fluidly sealed and bonded to rigid lens 194. This may be accomplished, for example, by laying tube 200 across rigid lens 194 before membrane 198 is bonded to rigid lens 194. Tube 200 is configured to allow fluid to enter or exit the cavity to inflate or uninflate the membrane. In some embodiments, steps 204 and 206 of flow chart 212 will remain substantially the same as described herein for flow chart 202 in FIG. 10.

Figure 15:
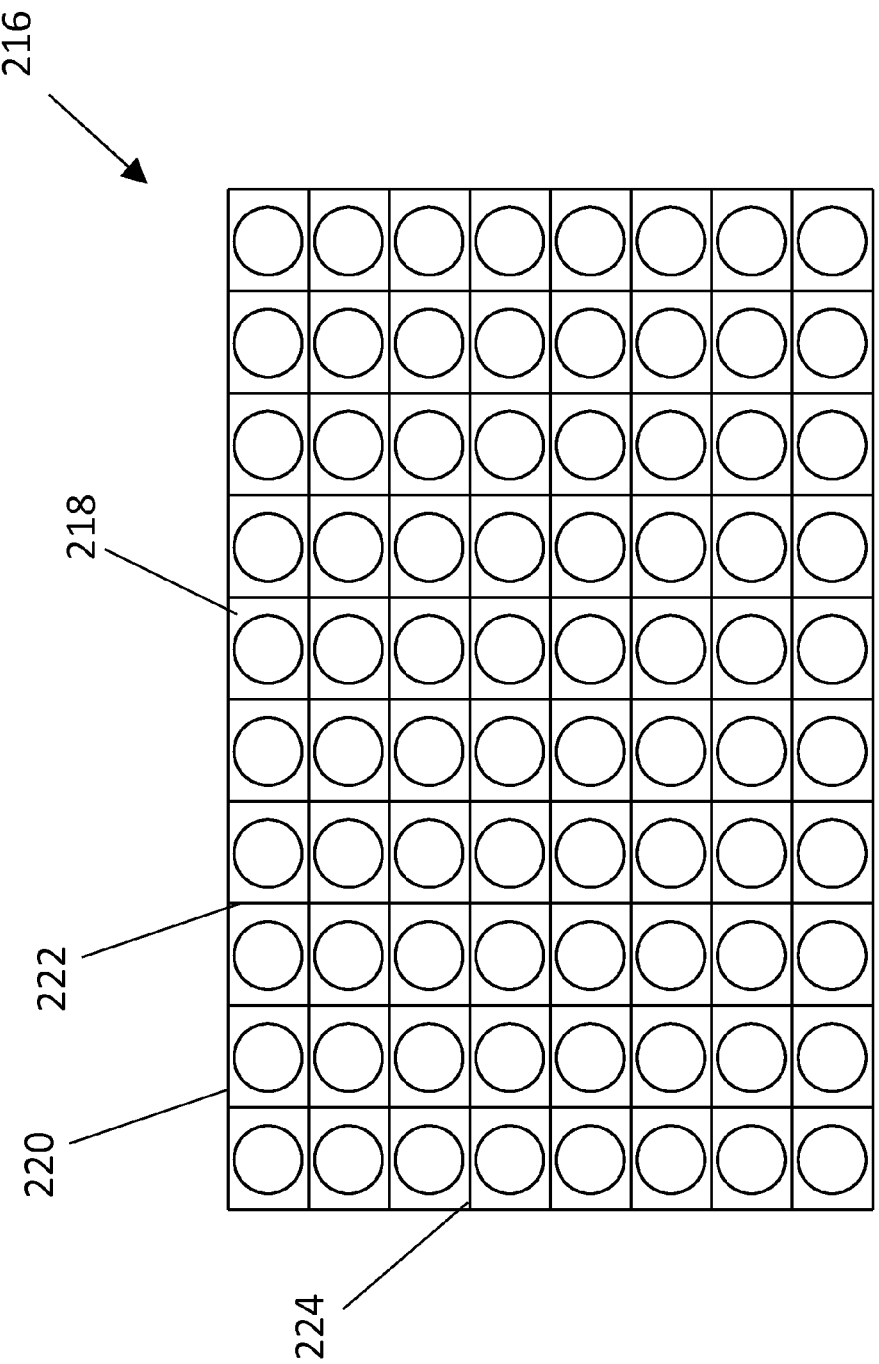
FIG. 15 illustrates a front view of an array of lens blanks according to an embodiment.

FIG. 15 illustrates a front view of an array 216 including a plurality of lens blanks 218 (which can also be referred to as "lenslets") according to an embodiment. Each of lens blanks 218 may be any suitable lens blank described herein. In some embodiments, lens blanks 218 are modified from one or more of the lens blanks described herein to achieve a desired array shape or configuration. Array 216 includes eight rows and ten columns of lens blanks 218 arranged in a rectangular shape. In some embodiments, array 216 includes a greater or lesser number of rows and/or columns. In some embodiments, array 216 is a desired non-rectangular shape. Array 216 may be formed from a single flat rigid lens 220, such as, for example, one or more of the rigid lenses described herein. In some embodiments, array 216 includes multiple pieces of rigid lens materials. In some embodiments, rigid lens 220 includes one or more curved pieces of rigid material. In some embodiments, one or more of the plurality of lens blanks 218 provide different optical properties from one or more of the other lens blanks 218 within array 216. For example, one or more of the plurality of lens blanks 218 may include different materials, thicknesses, curvatures, or other properties.

Array 216 includes vertical channels 222 and horizontal channels 224 formed in rigid lens 220. The channels may, for example, be a suitable depth and width to facilitate separating array 216 into separate lens blanks 218 or into a smaller array of a plurality of lens blanks 218. The separating process may include any suitable cutting and/or machining method described herein, such as, for example, through a glass cutter, saw, drill, scissors, knife, laser, plasma cutter, or water jet cutter. In some embodiments, the channels are diagonal or curved. The channels may be in the form of one or more desired shapes. For example, the channels may be in the shape of one or more of a rectangle, triangle, circle, ellipse, or non-geometric shape. In some embodiments, array 216 does not include channels. In some embodiments, array 216 includes cutting lines on or below a surface of array 216 to facilitate separating array 216 or for other desired uses.

Figure 16:
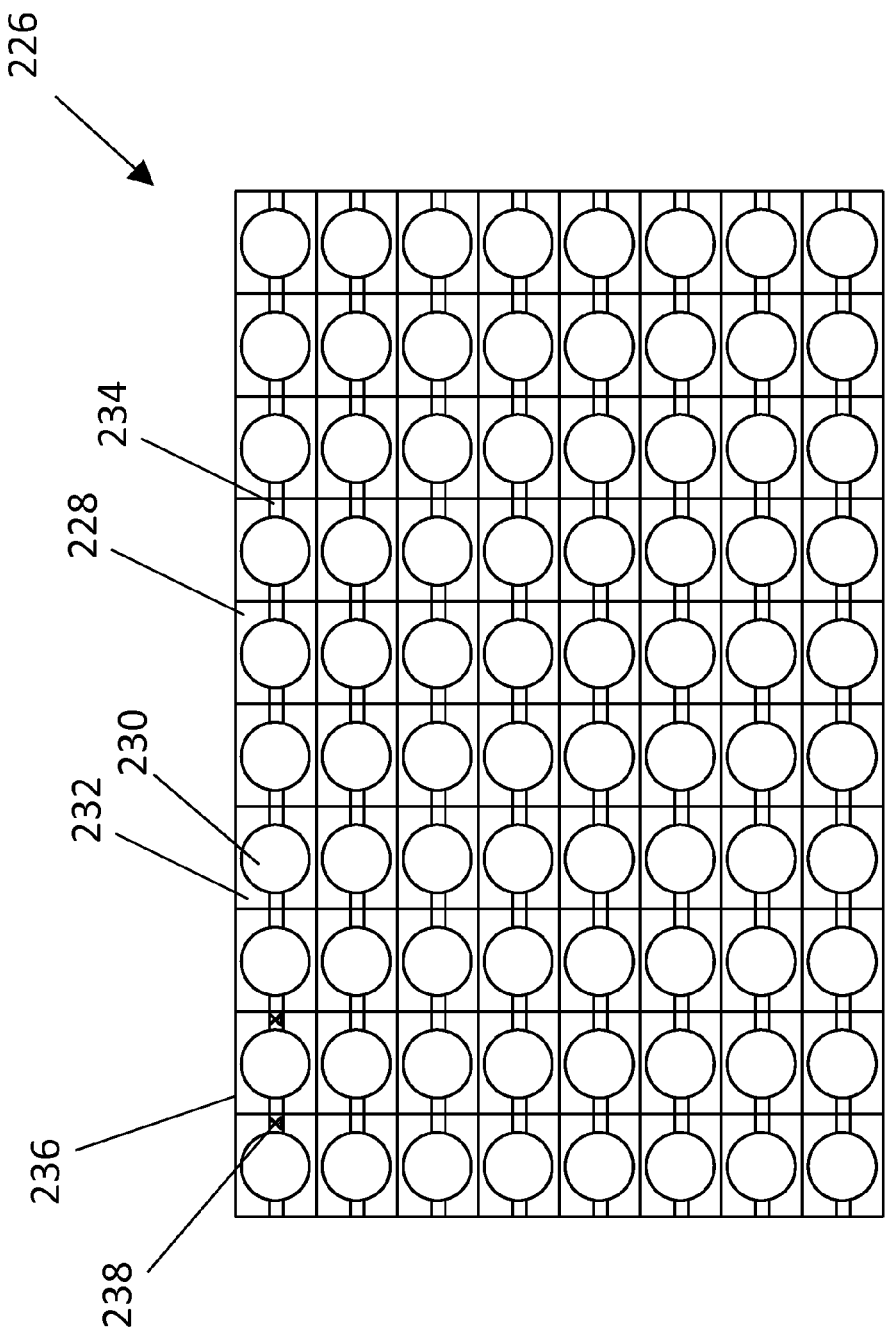
FIG. 16 illustrates a front view of an array of fluid lenses according to an embodiment.

FIG. 16 illustrates a front view of an array 226 of fluid lenses 228 according to an embodiment. Fluid lenses 228 or a desired plurality of fluid lenses 228 may be sliced apart and used, for example within ophthalmic or microfluidic devices. Each fluid lens 228 includes a cavity zone 230 and bonded zone 232 similar to other suitable fluid lenses described herein. Cavity zone 230 may be in the shape of a circle. In some embodiments, one or more of cavity zones 230 are in other suitable shapes, such as, for example, an ellipse. In some embodiments, cavity zone 230 is formed with a surface relief (e.g., a depression) for each fluid lens 228. Rigid plate 236 may be composed or manufactured similarly to any suitable rigid lenses described herein. In some embodiments, rigid plate 236 is injection molded or cast-molded from a liquid prepolymer using appropriate forming tools or inserts. In some embodiments, rigid plate 236 is machined from a flat panel.

Array 226 further includes channels 234 that fluidly connect one or more fluid lenses 228 with one or more additional fluid lenses 228. In the embodiment, shown in FIG. 16, channels 234 connect each fluid lens 228 to its two adjacent fluid lenses in a horizontal direction. In some embodiments, one or more channels can have a width ranging from about 20 microns to about 1 mm. Channels can be configured to connect adjacent or non-adjacent fluid lenses in one or more horizontal, vertical, diagonal, or other directions as desired. Channels 234 may be formed, for example, by laser scribing. In some embodiments, channels 234 are formed by water jet processing.

In the embodiment shown in FIG. 16, several fluid lenses 228 include valves 238 within one or more of channels 234. Valves 238 are controllable to fluidly seal one or more of channels 234 and prevent fluid from entering or exiting a specific fluid lens 228. In some embodiments, every fluid lens 228 includes at least one valve 238. In some embodiments, valves 238 are configured to automatically fluidly seal channel 234 once a desired state within cavity zone 230 or channel 234 is reached. For example, valves 238 may be configured to automatically fluidly seal channel 234 once a desired fluid pressure, volume, temperature, or flow rate within cavity zone 230 or channel 234 is reached or maintained for a predetermined length of time.

In some embodiments, valves 238 are operatively connected to a flow controller. Flow controllers may be used to control fluid flow for a single fluid lens 228 or between a plurality of adjacent or non-adjacent fluid lenses 228. The flow controllers may be electrically operated. One or more flow controllers may be addressable by one or more logic controllers to adjust fluid flow within each fluid lens 228 separately. In some embodiments, the adjustment of fluid flows within one or more of the fluid lenses 228 can adjust the optical power for one or more fluid lenses 228. In some embodiments, such a configuration may allow multiple optical powers within a lens array formed by a plurality of lenslets 228. In some embodiments, a lens array formed by a plurality of lenslets 228 can be in the form of bifocal eyeglasses having two distinct optical powers.

In some embodiments, valves are not used to control optical power within a plurality of fluid lenses. Fluid lenses 228 may be configured to allow for different optical powers within array 226 based on differences between the material properties or shapes of the materials or components. For example, array 226 can include fluid lenses 228 having different membrane materials with different inflation characteristics, different rigid lens curvatures, or different channel thicknesses, any of which may affect the optical powers of one or more fluid lenses 228 within array 226.

As shown in FIG. 16, array 226 includes eight rows and ten columns of fluid lenses 228 arranged in a rectangular shape. In some embodiments, array 226 includes a greater or lesser number of rows and/or columns. For example, array 226 may include several hundred, thousand, or more fluid lenses 228 formed on a single plate. In some embodiments, array 226 includes 900 fluid lenses 228, with each fluid lens 228 having an area from about 1 mm² to about 10 mm².

While various embodiments of the present invention have been described above, it should be understood that they have been presented by way of example only, and not limitation. It will be apparent to persons skilled in the relevant art that various changes in form and detail may be made therein without departing from the spirit and scope of the invention. Thus, the breadth and scope of the present invention should not be limited by any of the above-described exemplary embodiments, but should be defined only in accordance with the following claims and their equivalents.

The choice of materials for each of the pieces in the embodiments of the assemblies described herein may be informed by the requirements of mechanical properties, temperature sensitivity, optical properties, such as dispersion, moldability properties, or any other factor apparent to a person having ordinary skill in the art. For example, the pieces of the various assemblies described may be manufactured through any suitable process, such as metal injection molding (MIM), cast, machining, plastic injection molding, and the like. The assemblies may be any suitable shape, and may be made of plastic, metal, or other suitable material. In some embodiments, lightweight material may be used such as, for example and without limitation, high impact resistant plastics material, aluminum, titanium, or the like. In some embodiments, one or more of the parts may be made entirely or partly of a transparent material.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An array of fluid lens blanks, comprising:
   a plurality of fluid lens blanks, wherein each fluid lens blank of the plurality of fluid lens blanks, comprising:
   a rigid lens, and
   a semi-flexible inflatable membrane directly attached to a front face of the rigid lens,
   wherein each fluid lens blank is divided into at least two zones, the zones comprising:
      a first zone extending radially outward from a central area of each fluid lens blank, forming a cavity between the membrane and the front face of the rigid lens in the cavity zone, and
      a second zone extending radially outward from the first zone toward an edge of each fluid lens blank,
   wherein the membrane is fluidly sealed to the front face of the rigid lens throughout the second zone, and
   wherein the second zone is dimensioned so that each fluid lens blank is configured to:
      i) accommodate a plurality of frame shapes and sizes, and
      ii) maintain the membrane to be fluidly sealed to the front face of the rigid lens.

2. The array of fluid lens blanks of claim 1, wherein each fluid lens blank is divided into at least three zones, a third zone comprising: an outer zone extending radially outward from a peripheral edge of the membrane to a peripheral edge of the front face of the rigid lens.

3. The array of fluid lens blanks of claim 1, wherein the membrane is sealed directly to the front face of the rigid lens.

4. The array of fluid lens blanks of claim 1, wherein the first zone is sub-divided into an aspheric sub-zone extending radially outward from a central area of the first zone, and a spherical sub-zone extending radially outward from the aspheric sub-zone to the second zone, wherein the curvature of the rigid lens within the aspheric sub-zone is aspheric and the curvature of the rigid lens within the spherical sub-zone is spherical, and wherein the thickness of the membrane within the aspheric sub-zone is contoured such that the contour offsets the asphericity of the rigid lens within the aspheric sub-zone.

5. The array of fluid lens blanks of claim 4, wherein the aspheric sub-zone is in the shape of an oval.

6. The array of fluid lens blanks of claim 1, wherein the inner peripheral edge of the second zone is in the shape of an oval.

7. The array of fluid lens blanks of claim 1, wherein the optical power of the first zone ranges from about −1.0 D in an uninflated state to about +1.0 D in an inflated state.

8. The array of fluid lens blanks of claim 1, wherein the optical power of the variable portion ranges from about +0.25 D in an uninflated state to about +4.0 D in an inflated state.

9. The array of fluid lens blanks of claim 1, wherein a refractive index of the rigid lens and a refractive index of the membrane do not differ by more than 0.01 units.

10. The array of fluid lens blanks of claim 1, wherein the cavity is at least partially filled with fluid comprising at least one photochromic additive.

11. The array of fluid lens blanks of claim 1, wherein each fluid lens blank further comprises: a channel formed within the rigid lens, wherein the channel is configured to allow fluid to enter or exit the cavity to inflate or uninflate the membrane.

12. The array of fluid lens blanks of claim 1, wherein each fluid lens blank further comprises: a tube disposed between the membrane and rigid lens, wherein the tube is configured to allow fluid to enter or exit the cavity to inflate or uninflate the membrane.

13. The array of fluid lens blanks of claim 1, wherein a refractive index of adhesive and a refractive index of the rigid lens do not differ by more than 0.01 units.

14. The array of fluid lens blanks of claim 1, wherein a refractive index of adhesive and a refractive index of the membrane do not differ by more than 0.01 units.

15. The array of fluid lens blanks of claim 1, wherein a refractive index of adhesive and a refractive index of fluid disposed within the cavity do not differ by more than 0.01 units.

16. The array of fluid lens blanks of claim 1, wherein at least one first fluid lens blank of the plurality of fluid lens blanks has at least one different optical property with respect to at least one second fluid lens blank of the plurality of fluid lens blanks within the array.

17. The array of fluid lens blanks of claim 1, wherein the plurality of frame shapes and sizes include a plurality of frame shape and size combinations, wherein each frame shape and size combination has:
   a width being within a range of from 20 mm to 60 mm and
   a height being within a range of from 10 mm to 30 mm.

* * * * *